United States Patent
Bui et al.

(10) Patent No.: US 7,649,710 B2
(45) Date of Patent: Jan. 19, 2010

(54) MOVING MAGNET ACTUATION OF TAPE HEAD

(75) Inventors: Nhan Xuan Bui, Tucson, AZ (US); Reed Alan Hancock, Tucson, AZ (US); David Howard Flores Harper, Vail, AZ (US); Wayne Isami Imaino, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 147 days.

(21) Appl. No.: 12/028,676

(22) Filed: Feb. 8, 2008

(65) Prior Publication Data
US 2009/0201603 A1    Aug. 13, 2009

(51) Int. Cl.
G11B 5/584    (2006.01)
(52) U.S. Cl. .................................... 360/77.12
(58) Field of Classification Search ............... 360/77.12, 360/78.05, 160, 261.1, 261.3, 291
See application file for complete search history.

(56) References Cited

U.S. PATENT DOCUMENTS

| | | | |
|---|---|---|---|
| 3,037,290 A | 6/1962 | Dolby |
| 4,310,863 A | 1/1982 | Lelandais |
| 4,427,166 A | 1/1984 | Oishi et al. |
| 4,458,854 A | 7/1984 | Richard |
| 4,466,582 A | 8/1984 | Shiba |
| 4,509,031 A | 4/1985 | Sakata et al. |
| 4,541,557 A | 9/1985 | Fell et al. |
| 4,633,347 A | 12/1986 | Higgins |
| 5,005,089 A | 4/1991 | Thanos et al. |
| 5,172,282 A | 12/1992 | Ghose |

(Continued)

FOREIGN PATENT DOCUMENTS

JP    63222361 A2    9/1988

OTHER PUBLICATIONS

U.S. patent application entiteld "Magnetically Biased Tilting Roller Bearing Tape Guidance", serial No. unknown, filed Jan. 29, 2008, by inventors A.J. Argumedo, N.X. Bui, W. M. Dyer, R.A. Hancock, D.H. Harper, W.I. Imaino and K.B. Judd.

(Continued)

*Primary Examiner*—Fred Tzeng
(74) *Attorney, Agent, or Firm*—William K. Konrad; Konrad Raynes & Victor LLP

(57) ABSTRACT

In one embodiment, a tape read/write head supported by a lever is biased in a first position, using magnetic attraction between a magnet supported by the lever, and a return path structure of magnetically permeable material. In the illustrated embodiment, the magnet centers itself, in the absence of a coil generated magnetic field, in the middle of a gap of the magnetic return path structure. In one aspect, the mass of the read/write head and one side of the lever may be balanced by the mass of the magnet and the other side of the lever. The lever and hence the tape read/write head carried by the lever, may be pivoted by conducting current through a coil to generate a magnetic field which is conducted by the return path structure to interact with the magnetic field of the magnet. As a consequence, the lever pivots on a pivot axis as a function of the magnitude and direction of the current through the coil. The face of the magnet may be divided into portions of opposite magnetic polarity to facilitate a relatively pure torque to be developed substantially without a net force. Other embodiments are described and claimed.

25 Claims, 5 Drawing Sheets

U.S. PATENT DOCUMENTS

| | | | |
|---|---|---|---|
| 5,434,732 A | | 7/1995 | Schwarz et al. |
| 5,447,279 A | | 9/1995 | Janssen et al. |
| 5,452,153 A | * | 9/1995 | Baheri et al. ............. 360/78.05 |
| 5,507,424 A | | 4/1996 | Kitajima et al. |
| 5,625,515 A | | 4/1997 | Brown |
| 5,677,806 A | * | 10/1997 | Eckberg et al. .......... 360/77.12 |
| 5,726,834 A | | 3/1998 | Eckberg et al. |
| 5,731,935 A | | 3/1998 | Lian et al. |
| 5,788,137 A | | 8/1998 | Ku |
| 5,793,573 A | * | 8/1998 | Eckberg et al. .......... 360/261.3 |
| 5,798,885 A | | 8/1998 | Saiki et al. |
| 5,828,514 A | * | 10/1998 | Chliwnyj et al. ......... 360/77.12 |
| 5,872,672 A | * | 2/1999 | Chliwnyj et al. ......... 360/77.12 |
| 5,949,619 A | * | 9/1999 | Eckberg et al. ............. 360/291 |
| 6,137,659 A | | 10/2000 | Warmenhoven |
| 6,208,497 B1 | | 3/2001 | Seale et al. |
| 6,467,669 B1 | | 10/2002 | Okada |
| 6,754,033 B1 | | 6/2004 | Argumedo et al. |
| 6,762,665 B1 | | 7/2004 | Iwai et al. |
| 6,963,467 B2 | | 11/2005 | Bui et al. |
| 7,054,101 B1 | | 5/2006 | Marion et al. |
| 2003/0016467 A1 | | 1/2003 | Bui et al. |
| 2005/0201017 A1 | | 9/2005 | Koga et al. |
| 2007/0041121 A1 | * | 2/2007 | Neumann ................. 360/77.12 |
| 2009/0073603 A1 | * | 3/2009 | Koeppe .................... 360/77.12 |
| 2009/0116140 A1 | * | 5/2009 | Harper ..................... 360/77.12 |
| 2009/0174963 A1 | * | 7/2009 | Liang et al. .............. 360/77.12 |
| 2009/0174964 A1 | * | 7/2009 | Cherubini et al. ........ 360/77.12 |

OTHER PUBLICATIONS

U.S. patent application entitled "Friction Engaged Tilting Roller Bearing Tape Guidance", serial No. unknown, filed Jan. 29, 2008, by inventors A.J. Argumedo, W. M. Dyer, W.I. Imaino and K.B. Judd.

U.S. patent application entitled "Blanced Linkage Actuation of Tape Head", serial No. unknown, filed Jan. 29, 2008, by inventor D.H. Harper.

* cited by examiner

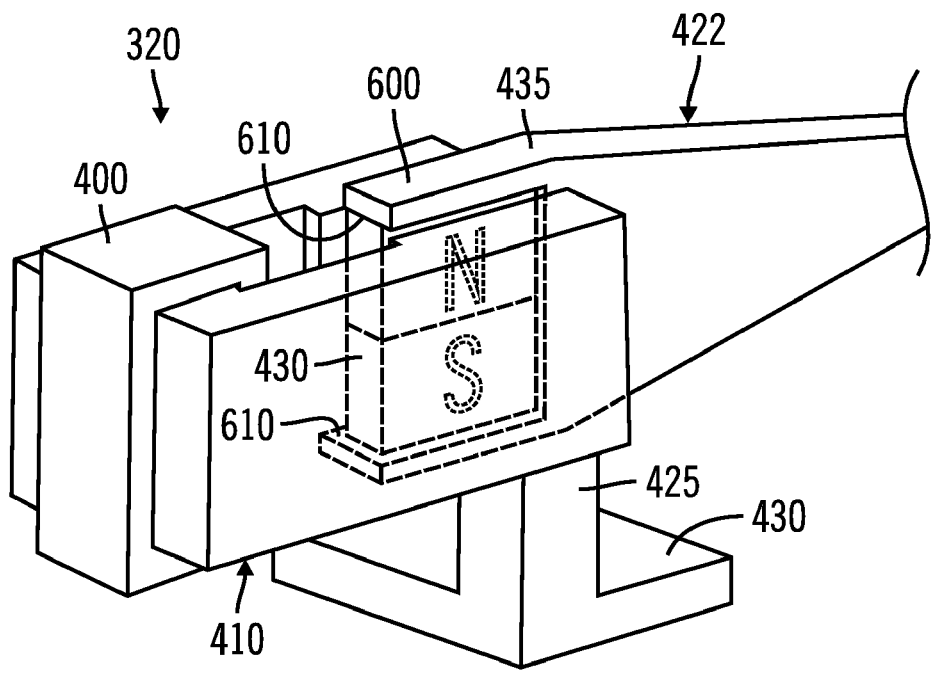

| Bias a tape read/write head supported by a lever in a first position using magnetic attraction between a magnet supported by the lever, and a return path structure of magnetically permeable material. | — 900 |

↓

| Sense the lateral position of tracks on a moving tape. | — 910 |

↓

| Pivot the lever and the tape read/write head by conducting current through a coil to generate a magnetic field which is conducted by the return path structure to interact with the magnetic field of the magnet. | — 920 |

FIG. 9

MOVING MAGNET ACTUATION OF TAPE HEAD

BACKGROUND

Data storage on magnetic tape is well known and tape recorders have been used to record data tracks on magnetic tape. Traditionally, data is recorded in a plurality of parallel data tracks on the magnetic tape. The read/write head is then positioned relative to the tape path by moving the head to different track positions as desired. In such a system, the tape tracks are generally sufficiently wide and separated to facilitate reliably reading and writing the data.

In one approach, the read/write head may be positioned at a predetermined fixed point, relative to the magnetic tape path, and the data tracks are intended to accommodate variations of recording track location and tape locations as the tape feeds past the head. Historically, this accommodation has been accomplished by providing sufficient track width and data track separation on the magnetic tape to permit the read/write head to remain positioned over the designated track and at the same time not read magnetically recorded signals from an adjacent track. This arrangement of track width and track separation is intended to accommodate deviation of the track location from the design norm either due to being recorded on a first recorder and played or rerecorded on a second recorder or due to the wander of the tape as it is spooled past the read/write head from one spool to the other spool of a cartridge.

However, the definition of the magnetic read/write head and the track widths and separations can limit the number of data tracks that may be recorded on any given width of tape. Reliance solely on the track width and track separations for reliable read/write operations can result in a significant waste of magnetic tape surface and thus limit the data density on the tape. However, as the track width and the read/write head width narrow in an effort to increase the data capacity of a given tape area, any misalignment of the head with the track may lead to read/write repeatability failures and lost data. Thus, the resolution of the head placement mechanism and the precision of the placement of the tape relative to the read/write head can be limiting factors affecting the recording density of data on the magnetic tape surface in tape drives having static read/write heads.

More recently, tape drive systems have used a track following servo system for moving the tape head in a lateral direction to follow lateral movement of the longitudinal tracks as the tape is moved in the longitudinal direction. The track following servo system may employ servo tracks on the tape which are parallel to the data tracks, and employ servo read heads to read the servo tracks to detect position error and thereby position the tape head at the data tracks and follow the data tracks. This allows the data tracks to be placed closely together and increase the number of data tracks.

The tape is typically contained in a cartridge of one or two reels, and the tape is moved between a supply reel and a take up reel. The reels typically have runout causing the tape to move laterally as the tape is moved longitudinally. Tape guides are often provided to limit the amplitude of the lateral movement of the tape so that it does not exceed the lateral movement capability of the track following servo system.

In high track density tape storage devices, a compound actuator may be used in a track following system. The compound actuator typically includes a coarse actuator which usually is a stepper motor and a fine actuator which frequently has a linear high bandwidth, and a limited range of travel. Thus, a compound actuator can have both high bandwidth and a large working dynamic range.

In such a compound actuator system, a magnetic read head gap may be placed at a position relative to a servo track on the tape. Then the read head gap is further moved to detect the edge of the servo control track (servo track) recorded on the tape. The read head will provide signals which may be used to indicate the head location relative to the servo track. By using these signals as a basis, the servo control then may produce a positioning signal to drive a servo positioner. The servo positioner moves the read head, causing the read head to track or follow the edge of the servo control track which has been previously recorded on the tape.

The transient response of the tape head track following servo system typically comprises a high bandwidth for a very limited lateral movement, called "fine" track following, for allowing the tape head to accurately follow small displacements of the tape. Larger movement of the tape head is typically conducted as "coarse" track following, which is also employed to shift the tape head from one set of tracks to another set, and is typically conducted at a slow rate. However, it is appreciated that the occurrence of a lateral transient shift, can be so rapid that neither the fine track follower nor the coarse track follower is able to respond sufficiently. As a result, the tracking can become so large that writing may be stopped to prevent overwriting an adjacent track and to insure that the tracking error on read back is not so large as to cause a readback error.

An example of a compound actuator is described in coassigned U.S. Pat. No. 5,793,573. FIG. 10 shows one example of an existing fine actuator 1000 having a tape head (not shown) suspended by a beam 1015 between dual flextures 1020, 1030. A voice coil motor disposed in a base 1040 is coupled to the lower flexture 1030 and to the beam 1015 supporting the head between the flextures 1020, 1030. Current applied to the voice coil motor causes the motor to displace the lateral location of the head relative to the tape, depending upon the direction and magnitude of the applied current.

The flextures 1020, 1030 each have a spring constant which biases the beam 1015 and the head to a central neutral location in the absence of current applied to the voice coil motor. To counteract a natural resonance frequency of the spring constant exhibited by the flextures 1020, 1030, a damping mechanism such as a damping fluid may be provided in the base 1040. Such an arrangement is believed to be relatively expensive to manufacture and relatively susceptible to shock and vibration which can adversely affect tracking accuracy.

SUMMARY OF THE DESCRIPTION

In one embodiment, a tape read/write head supported by a lever is biased in a first position, using magnetic attraction between a magnet supported by the lever, and a return path structure of magnetically permeable material. In the illustrated embodiment, the magnet centers itself, in the absence of a coil generated magnetic field, in the middle of a gap of the magnetic return path structure. To facilitate the centering, the mass of the read/write head and one side of the lever may be balanced by the mass of the magnet and the other side of the lever.

The lateral position of tracks on a moving tape are sensed and in response, the lever and hence the tape read/write head carried by the lever, may be pivoted relative to a first support frame. In the illustrated embodiment, the lever and hence the tape read/write head carried by the lever, may be pivoted by conducting current through a coil to generate a magnetic field which is conducted by the return path structure to interact with the magnetic field of the magnet. As a result, the lever pivots on a pivot axis as a function of the magnitude and direction of the current through the coil. To facilitate the dynamic response, the mass of the read/write head and one side of the lever may be balanced by the mass of the magnet and the other side of the lever as described above. In addition, the face of the magnet may be divided into portions of opposite magnetic polarity. In one aspect, the magnetic polarization of the magnet can allow a relatively pure torque to be developed substantially without a net force. Such an arrangement can reduce the force of constraint in the pivot and, it is believed, facilitate achieving improved dynamic response.

Other embodiments are described and claimed.

BRIEF DESCRIPTION OF THE DRAWINGS

Referring now to the drawings in which like reference numbers represent corresponding parts throughout:

FIG. 6 is a rear, isometric schematic view of one embodiment of a fine actuator in accordance with the present description;

FIG. 9 is a flow chart depicting one embodiment of operations of a fine actuator in accordance with the present description.

DETAILED DESCRIPTION

In the following description of the exemplary embodiment, reference is made to the accompanying drawings which form a part hereof, and in which is shown by way of illustration a specific embodiment which may be practiced. It is to be understood that other embodiments may be utilized as structural changes may be made without departing from the scope of the present description.

In one embodiment, a balanced actuator is provided for a tape head. It is believed that an actuator in accordance with the present description can perform well in a shock and vibration environment. In addition, a spring or other flexture may be eliminated. It is appreciated that other features may be realized, depending upon the particular application.

In one aspect, the mass of the tape head may be balanced by the mass of a movable permanent magnet. When a coil of the actuator is not energized, the magnet may be arranged to be self centering in the middle of a gap between fixed pole pieces. As a consequence, springs or other flexures may be reduced or eliminated.

In another aspect, the head may be actuated using relatively strong reluctance forces of the moving magnet. As a result, it is believed the actuator can achieve a relatively high gain and bandwidth. In addition, it is further believed that an actuator in accordance with the present description can be relatively simple and inexpensive to manufacture.

In yet another aspect, it is believed that the dynamics of the actuator system can be readily modified or optimized by adjusting the moving mass and the materials used in the design. Still further, the dimensions of the magnetic circuit and the materials used can be optimized to improve the dynamics such as the damping and return force. It is appreciated that the particular features and aspects may vary, depending upon the particular application.

Figure 1:
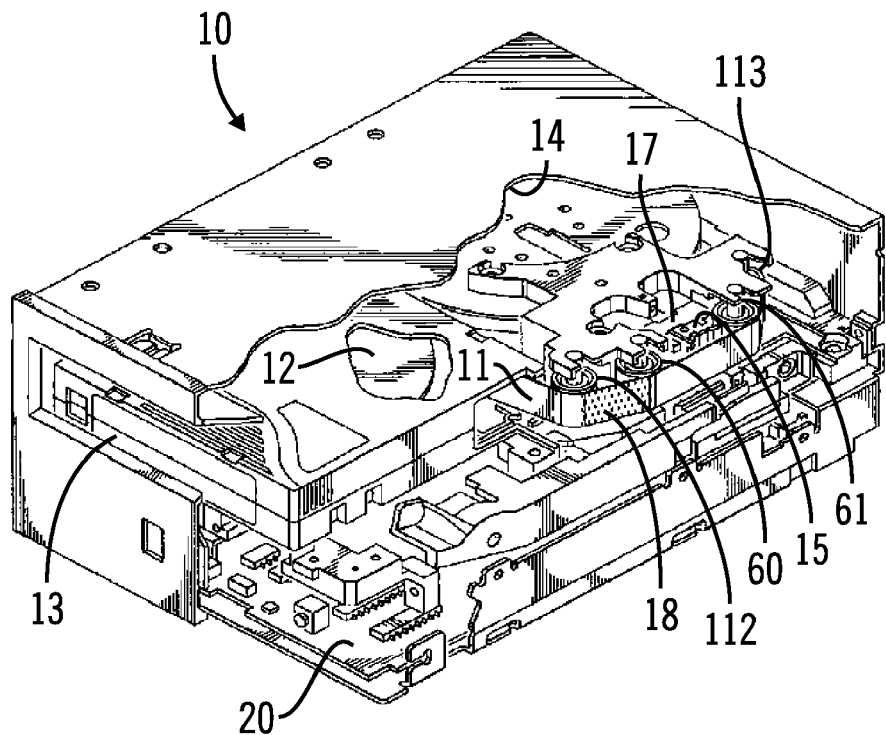
FIG. 1 illustrates one embodiment of a tape drive implementing a servo system in accordance with the present description.
Figure 10:
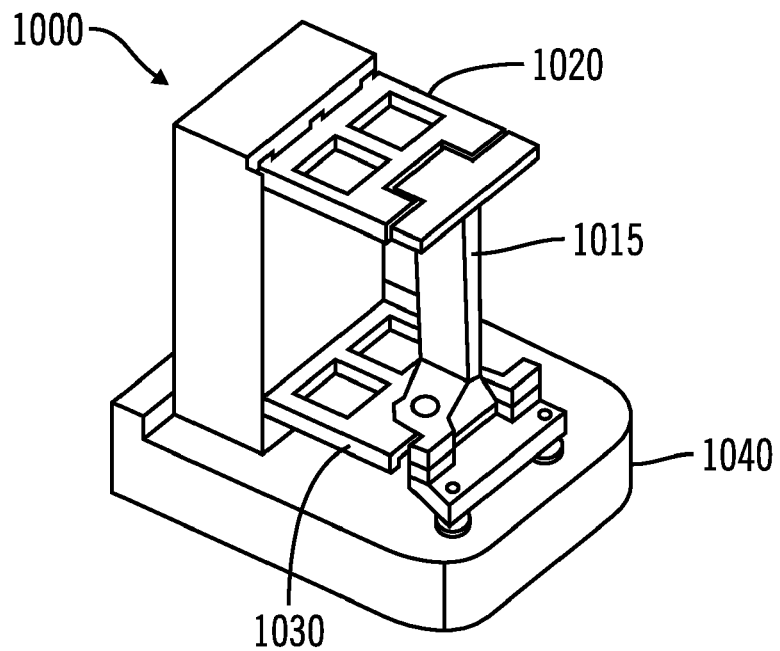
FIG. 10 is an isometric schematic view of a prior art fine actuator.

FIG. 1 illustrates a tape drive 10, such as a magnetic tape drive, utilizing a tape head actuator in accordance with one embodiment of the present description. A magnetic tape 11 is moved along a tape path from a supply reel 12 in a magnetic cartridge 13 to a take up reel 14, the reels comprising drive reels of a drive system operated by drive motors. The magnetic tape is moved along the tape path in a longitudinal direction across a tape head 15. The tape head is supported by an actuator 17 of a servo system, which, for example, may comprise a compound actuator. The tape head 15, for example, a magnetic tape head, may comprise a plurality of read and write elements and a plurality of servo read elements. The tape may comprise a plurality of servo tracks or bands 18 which are recorded on the tape in the longitudinal direction on the tape which are parallel to the data tracks. The servo read elements are part of a track following servo system for moving the tape head 15 in a lateral direction for following lateral movement of the longitudinal tracks as the tape 11 is moved in the longitudinal direction, and thereby position the tape head at the data tracks to follow the data tracks.

The compound actuator may comprise a coarse actuator, such as a stepper motor, and a fine actuator, such as a voice coil, mounted on the coarse actuator. In the illustrated embodiment, the fine actuator has a high bandwidth for a limited lateral movement, called "fine" track following, allowing the tape head to accurately follow small displacements of the tape. Larger movement of the tape head may be conducted by the coarse actuator which can center the actuator at the average position of the fine actuator during track following. The coarse actuator may also be employed to shift the tape head from one set of tracks to another set. The shifting may be conducted at a slow rate in the illustrated embodiment.

The tape drive 10 additionally comprises a controller 20 which provides the electronics modules and processor to implement the servo system to operate the compound actuator. The magnetic tape 11 of the present example may be provided in a tape cartridge or cassette 13 having a supply reel 12 or having both the supply and take up reels.

The data tracks of this embodiment may be narrow and closely spaced. Also, in this embodiment, the tape 11 can be very thin with little lateral stiffness at the edge. Tape guides 60, 61, 112, 113 may be provided which reduce excessive lateral movement of the tape, for example, from runout of the supply reel 112 or the take up reel 114, at least from the standpoint of the amplitude of the movement of the tape. However, when wound on a reel, tape is typically subjected to rapid lateral transient shifting, for example, from stack shifts or stagger wraps, in which one wrap of the tape is substantially offset with respect to an adjacent wrap. Other common sources of rapid lateral transient shifts include 1) a buckled tape edge in which the tape crawls against a tape guide flange and suddenly shifts laterally back down onto the bearing, 2) a damaged edge of the tape which causes the tape to jump laterally when contacting a tape guide, and 3) when the take up reel or supply reel runout is so significant that the reel flange hits the edge of the tape. It is appreciated that the heads, reels, tape, tracks, drives and tape guides may vary, depending upon the particular application.

In the illustrated embodiment, the fine actuator track following typically comprises a high bandwidth for a relatively limited lateral movement and therefore limited transient response for allowing the tape head to accurately follow small displacements of the tape. The coarse actuator of the illustrated embodiment, provides larger movement of the tape head for track following, which is also employed to shift the tape head from one set of tracks to another set, and is conducted at a slow rate. It is appreciated that the actuator type may vary, depending upon the particular application.

Figure 2:
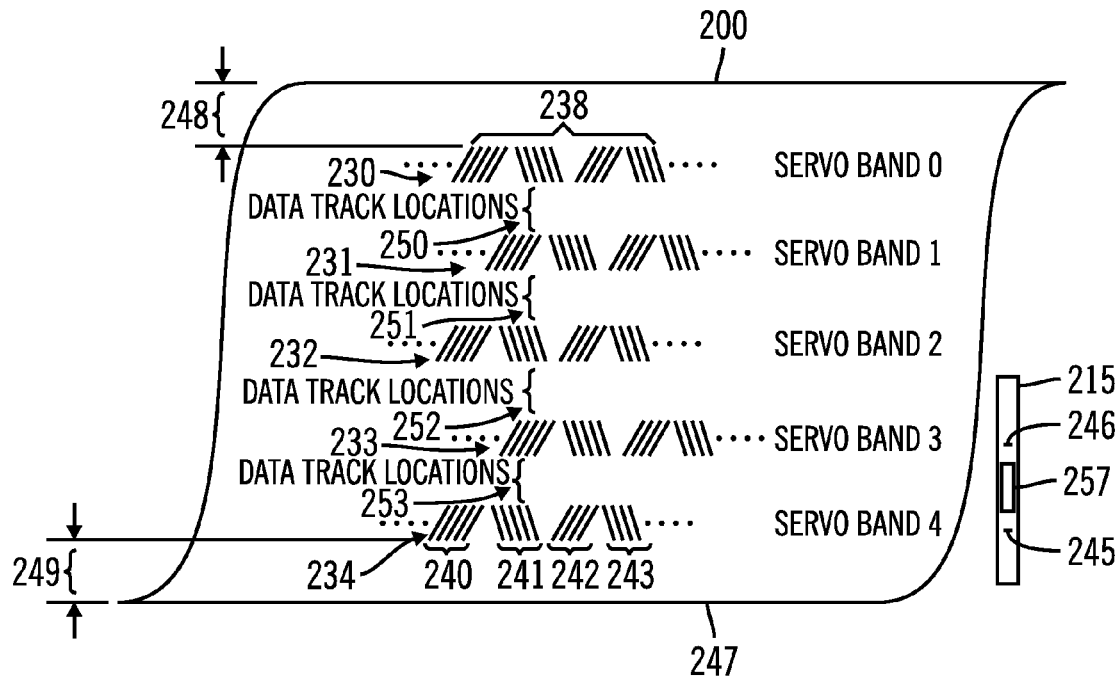
FIG. 2 illustrates one example of a section of a magnetic tape for use in a tape drive according to the present description.

FIG. 2 illustrates one example of a section of a magnetic tape 200 for use in a servo system according to the present description. The servo tracks or bands 230-234 may comprise any of several types of longitudinal servo patterns as is known to those of skill in the art. In the example of FIG. 2, a timing base servo pattern is illustrated, which is described in coassigned U.S. Pat. No. 5,689,384, and which comprises magnetic transitions recorded at more than one azimuthal orientation across the width of the servo track. In the specific example of FIG. 2, five longitudinal timing base servo tracks 230-234 are prerecorded on the magnetic tape 200 for track following at these positions. The pattern of magnetic transitions recorded in the servo tracks is a repeated set of frames 238, each of which are of different azimuthal orientations. In the example of FIG. 2, the tape head 215 comprises at least two narrow servo read elements 245, 246, allowing two servo tracks to be sensed simultaneously, and the outputs used redundantly to reduce error rates.

In the example of FIG. 2, lateral position sensing within a servo track is achieved by deriving a ratio of two servo pattern intervals and is relatively insensitive to tape speed. Specifically, the lateral position may be the ratio of (1) the distance between transitions of bursts 240 and 241, called the "A" distance, to (2) the distance between transitions of bursts 240 and 242, called the "B" distance. Thus, as the tape head servo read elements 245, 246 move toward the edge 247 of the tape 200, the ratio of the distance between the transitions of bursts 240 and 241 to the distance between the transitions of bursts 240 and 242 becomes greater, since the distance between the "A" transitions of bursts 240 and 241 is greater, while the distance between the "B" transitions of bursts 240 and 242 remains unchanged. What is actually measured are time TA and TB between the transitions defining the "A" and "B" distances which vary with tape speed. Since the "B" distance is unchanged at various lateral positions, the ratio TA/TB is the same as "A"/"B" and is insensitive to tape speed. Still referring to FIG. 2, the magnetic tape 200 may be provided with guard bands 248, 249 at the edges of the tape, and four data track regions 250-253 are provided between the servo tracks. A plurality of read and write elements 257 are provided at the tape head 215 for reading and/or writing data on the tape 200. When the servo elements 245, 246 are properly positioned at the specific servo tracks 230-234, the read and write elements 257 are properly positioned to transfer data with respect to the corresponding data track locations of the tape 200.

Figure 3:
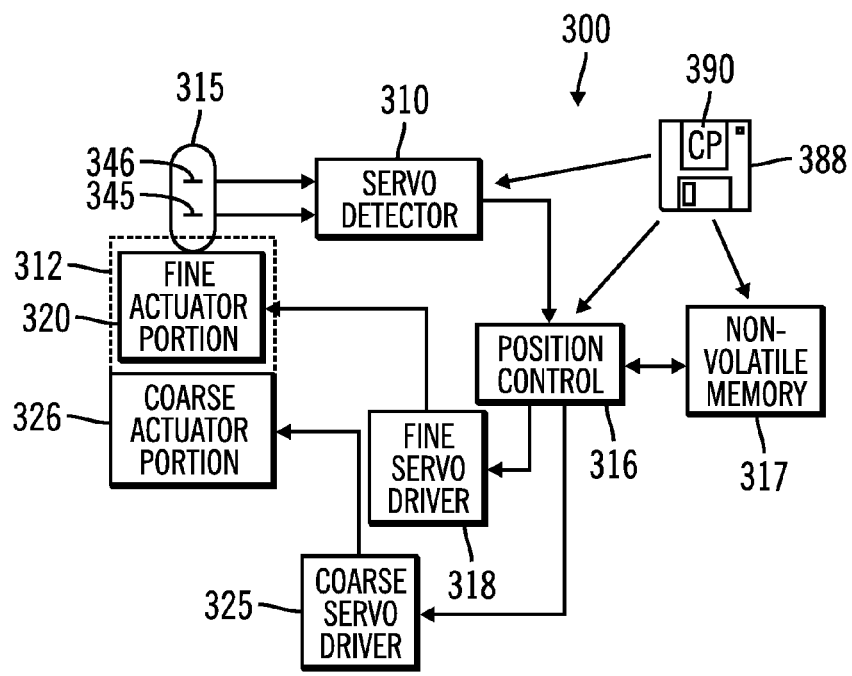
FIG. 3 illustrates an embodiment of a servo system having a fine actuator in accordance with the present description.

FIG. 3 illustrates one example of a servo system 300 according to the present description. In FIG. 3, a servo track sensor includes a servo detector 310 coupled to the servo elements 345, 346 of the tape head 315. A head position controller for controlling the head position actuator includes a position control 316 which may comprise a microprocessor or other controller with an attached nonvolatile memory 317 for storing information and programming for the position control. The position control 316 provides, for example, digital servo output data for operating the compound actuator 312. Those of skill in the art will understand that various devices are available to provide the needed signals for the servo detector and position control functions. A fine servo driver 318 converts track following servo output data to the appropriate drive signals for operating a fine actuator portion 320, and a coarse actuator driver 325 converts the coarse servo output data to, for example, appropriate step drive signals for operating a coarse actuator portion 326, of the compound actuator 312. The servo track detector 310 and drivers 318 and 325 may also comprise electronic modules of the system 300.

Figure 4:
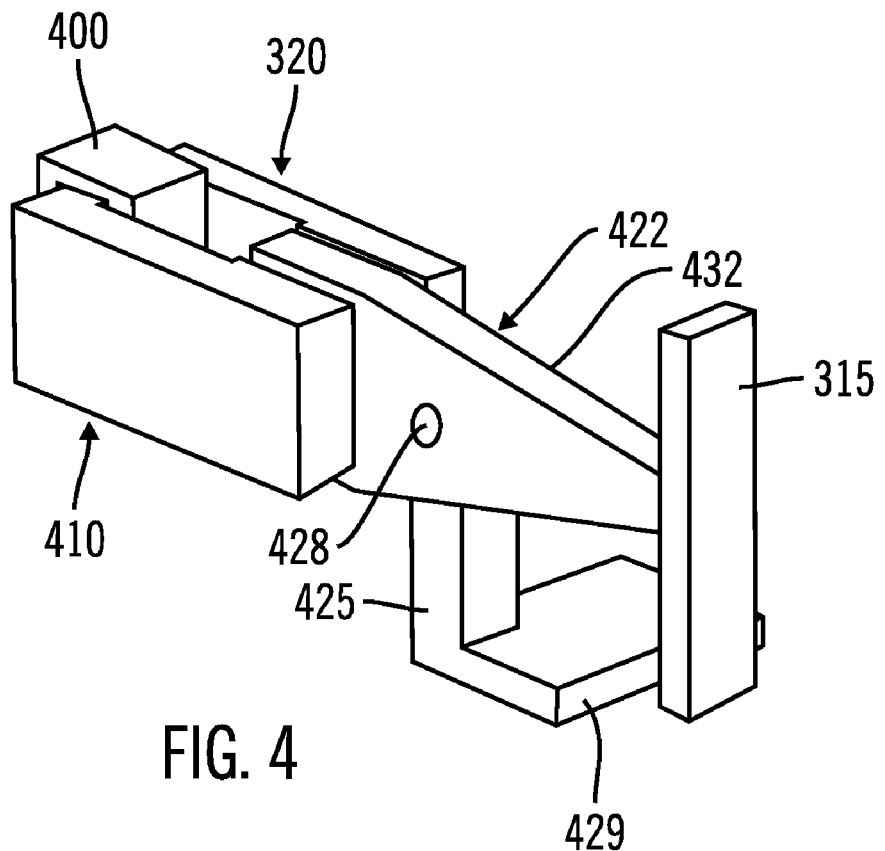
FIG. 4 is a front, isometric schematic view of one embodiment of a fine actuator in accordance with the present description.
Figure 5:
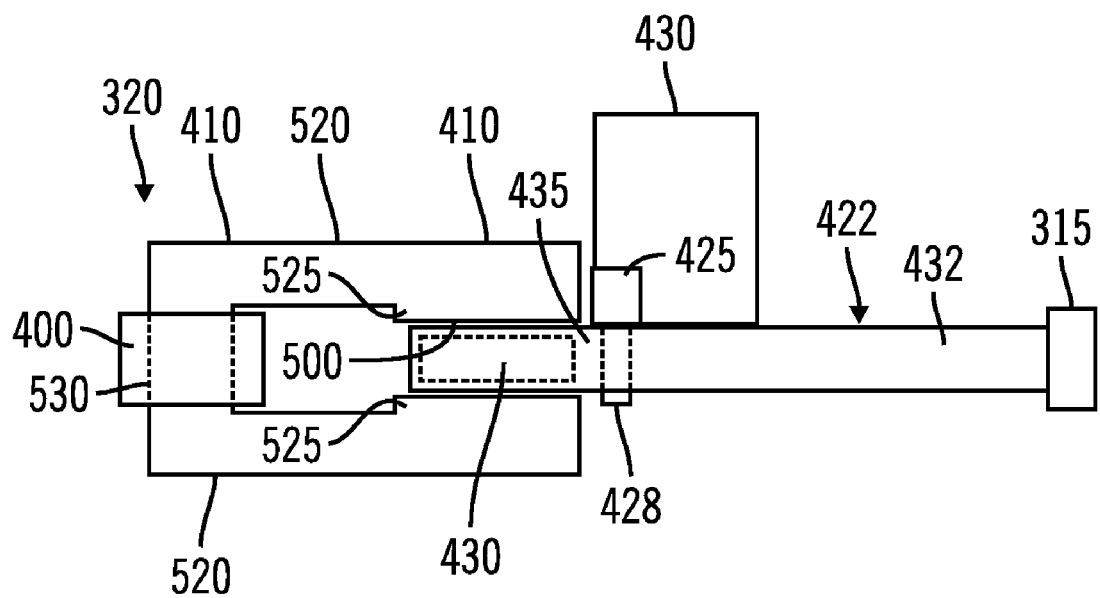
FIG. 5 is a top plan schematic view of the fine actuator of FIG. 4.

FIGS. 4-6 illustrate one embodiment of a fine actuator 320 for a tape read/write head 315. The actuator 320 includes a fixed coil 400 which is adapted to conduct an electric current provided by the fine servo driver 318, to generate a magnetic field. A return path structure 410 formed of a magnetically permeable material, is positioned adjacent the coil 400 to conduct the magnetic field generated by the coil 400. A lever 422 is pivotally coupled to a first support frame 425 at a pivot point 428. The support frame 425 includes a base 429. The tape head 315 is supported by the lever 422 on a first side 432 of the lever 422 relative to the pivot point 428.

A movable, permanent magnet 430 (FIGS. 5, 6) is supported by the lever 422 on a second side 435 (FIG. 5) of the lever 422 relative to the pivot point 428 and opposite that of the first side 432. In the illustrated embodiment, as shown in FIGS. 4-7a, 8a, the magnet 430 is positioned facing the return path structure 410 so that magnetic attraction between the magnet 430 and the return path structure 410 biases the magnet 430 and the tape read/write head in a first position relative to the first support frame 425. The magnetic fields produced by the magnet 430 are represented by the field lines 800a, 800b in FIG. 8a. In addition, current conducted through the coil 400 generates a magnetic field 810 (FIG. 8b) which is conducted by the return path structure 410 to span a gap 500 (FIGS. 5, 8b) to interact with the magnetic fields 800a, 800b of the magnet 430. As result of the interaction between the magnetic fields of the coil 400 and the magnet 430, the lever 422 and the tape head 315 pivot (FIGS. 7b, 8b) relative to the support frame 425 as a function of the magnitude and direction of the current through the coil 400.

As best seen in FIG. 6, the second side 435 of the lever 422 includes a magnet holder 600 adapted to hold the magnet 430. In the illustrated embodiment, the magnet holder 600 is formed by a recess 610 at the end of the second side 435 of the lever 422.

In the illustrated embodiment, the mass of the tape head 315 and its supporting first side 432 of the lever 422, may be balanced relative to the pivot point 428 by the mass of the magnet 430 and its supporting second side 435 of the lever 422. As a consequence, in one feature of the present description, the tape head 315 can be relatively resistant to the effects of shock or vibration which may occur in use. It is appreciated that other aspects may be realized, depending upon the particular application.

The return path structure 410 is positioned adjacent the coil 400 to conduct the magnetic field generated by the coil 400. The magnetic return path structure 410 is, in the illustrated embodiment, fixed, that is nonmoving, and may be supported by the first support frame 425 or other suitable support structure. As best seen in FIG. 5, the return path structure 410 includes a pair of parallel return pole pieces or members 520, each of which has an extension plate 525 extending from one end and separated by the gap 500. The return path structure 410 further includes a core 530 around which the coil 400 is wound. The core 530 also functions as the coil holder, and connects to the ends of the parallel return members 520. The return path structure 410 is made of a ferromagnetic material such as nickel, iron, steel or suitable magnetically permeable materials.

In another aspect of the present description, when the coil 400 is not energized, the magnet 430 is, in the absence of a coil 400 generated magnetic field 810, self centering (FIGS. 7*a*, 8*a*) in the middle of the extension plates 525 of the magnetic return path structure 410 which completes a magnetic circuit with the magnet 430. In this manner, the tape head 315 may be self centered as well. The magnetic attraction of the magnet 430 for the extension plates 525 of the magnetic return path structure 410 provides a return force and therefore a resonance. However, it is believed that such resonance will be damped by the magnetic path and therefore the use of an external damping mechanism may be reduced or eliminated. Thus, in one feature of the present description, use of flexures to center the lever 422 and tape head 315 relative to the tape 11 can be reduced or eliminated, which can reduce or eliminate any fundamental spring mass resonance of the actuator 320. As a consequence, the use of damping fluid or the like can also be reduced or eliminated. It is appreciated that other features may be realized, depending upon the particular application.

Figure 7A:
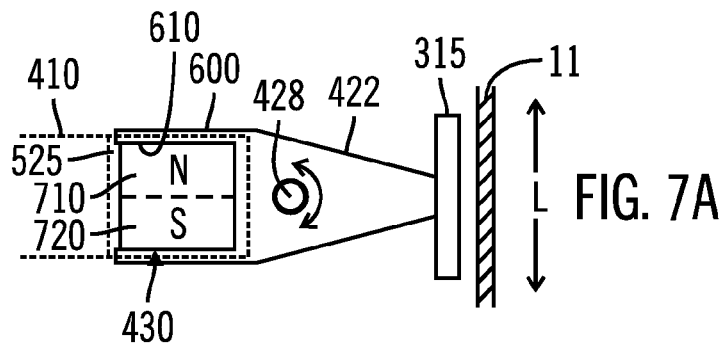
FIGS. 7a, 7b are schematic diagrams illustrating a first centered position and a second pivoted position, respectively of one embodiment of a fine actuator in accordance with the present description.
Figure 7B:
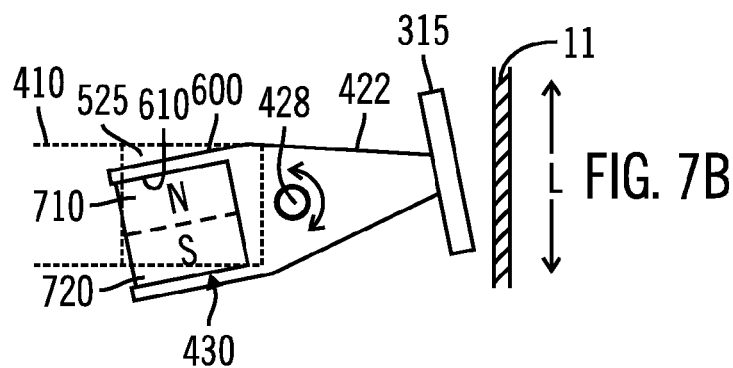

Conversely, to tilt the lever 422 and the tape head 315 from the centered position, the position control 316 and fine servo driver 318 causes current to be conducted through the coil 400 which generates a magnetic field 810 (FIG. 8*b*) which is conducted by the return path structure 410 to interact with the magnetic fields 800*a*, 800*b* of the magnet 430. This magnetic field interaction causes the magnet 430 and hence, the lever 422 and the tape head 315 to pivot on pivot 428 relative to the first support structure 425, as a function of the magnitude and direction of the current through the coil 400 as shown in FIGS. 7*b*, 8*b*.

Thus, current through the coil 400 produces a magnetic field normal to the wires of the coil 400. The coil generated magnetic field is directed by the return path structure 410 to be normal to the plane of FIG. 7*b* and parallel to the plane of FIG. 8*b* as it spans the gap 500 of the return path structure 410.

In the illustrated embodiment, the magnetic polarities of the magnet 430 are arranged to alternate as shown in FIGS. 7*a*-8*b*. More specifically, the face of the magnet 430 is magnetically polarized oppositely by halves 710, 720 as shown. In addition, the location of each polarity half 710, 720 is not centered in the flux 810 from the coil 400 and through the gap 500 return path structure 410. As a result, an up or down force results when the coil 400 is energized. In the illustrated embodiment, the magnetic field from the return path structure 410 is strongest in the central area 812*a*, 812*b* of the return path structure 410. Consequently, the offset of the magnet halves 710, 720 causes the up or down force as represented by flux vectors 814*a*, 814*b* in the case of a down force. Thus, the fixed coil 400 produces a flux 810 which, depending on the current direction, causes the head lever 422 to pivot up or pivot down. Although one magnet 430 is shown in the illustrated embodiment, it is appreciated that multiple magnets may be utilized to actuate the tape head, depending upon the particular application.

Figure 8A:
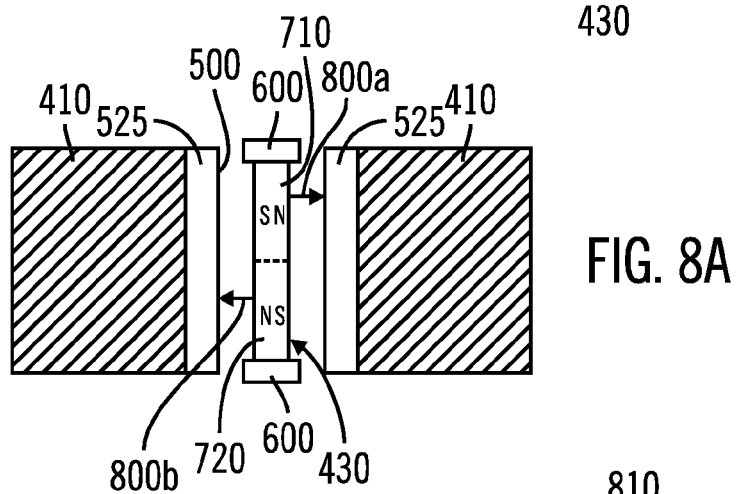
FIGS. 8a, 8b are schematic cross-sectional diagrams illustrating a first centered position and a second pivoted position, respectively of one embodiment of a fine actuator in accordance with the present description.
Figure 8B:
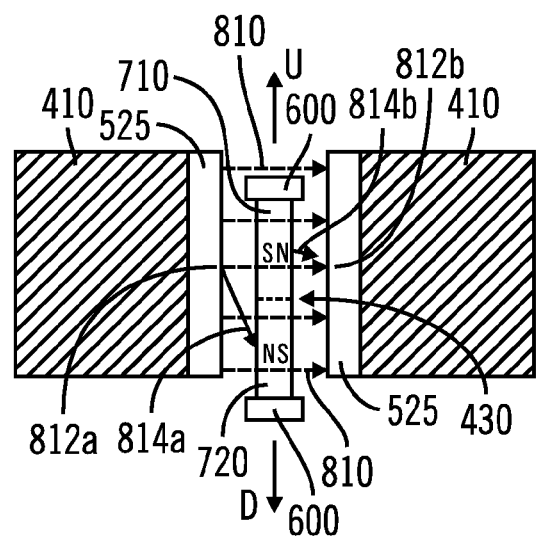

In the illustrated embodiment, the forces applied to the magnet 430 are in the up/down (U/D) direction (depending upon the current direction) in FIG. 8*b*. These forces cause tilting of the lever 422 about the pivot 428. The force, exerted on the magnet 430 is also known as the reluctance force, and is similar to the force produced in stepper motors or brushless motors.

In the illustrated embodiment, the magnet holder 600 is rigidly attached to the magnet 430, so that motion of the magnet 430 is directly transmitted to the magnet holder 600, lever 422, and the tape head 315. The motion of the magnet holder 600 and the lever 422 is constrained by the pivot at the pivot point 428. However, in the illustrated embodiment, the lever 422 moves or pivots free of flexural tension and thus is not constrained by flexures such as the flexures 1020, 2030. In this embodiment, a restoring force to the untilted position is provided without a mechanical spring due to the magnetic attraction (reluctance force) of the magnet 430 to the magnet return path structure 410. The magnetic attraction of the magnet 430 for the return path structure 410 also provides a force to the pivoting motion. Properties of the magnetic materials provide damping of the return force without a separate damping apparatus such as damping fluid. It is appreciated that in some embodiments, flexures and/or damping mechanisms may be added, depending upon the particular application.

Still further, it is believed that the dynamics of the actuator system can be readily modified or optimized by adjusting the moving masses and the materials used in the design. Still further, the dimensions of the magnetic gap 500 in which the magnet moves can be optimized to improve the dynamics such as damping and return force. It is appreciated that the particular features, such as materials choice and geometric configuration, and aspects may vary, depending upon the particular application.

FIG. 9 is a flowchart depicting one example of operations to control the position of a read/write head. In one operation, a tape read/write head supported by a lever is biased (block 900) in a first position, using magnetic attraction between a magnet supported by the lever, and a return path structure of magnetically permeable material. In the illustrated embodiment, the magnet centers itself, in the absence of a coil generated magnetic field, in the middle of a gap of the magnetic return path structure. To facilitate the centering, the mass of the read/write head and one side of the lever may be balanced by the mass of the magnet and the other side of the lever.

In another operation, the lateral positions of tracks on a moving tape are sensed (block 910). In response, the lever and hence the tape read/write head carried by the lever, may be pivoted (block 920) relative to a first support frame. In the illustrated embodiment, the lever and hence the tape read/write head carried by the lever, may be pivoted by conducting current through a coil to generate a magnetic field which is conducted by the return path structure to interact with the magnetic field of the magnet. As a consequence, the lever pivots on a pivot axis as a function of the magnitude and direction of the current through the coil. To facilitate the dynamic response, the mass of the read/write head and one side of the lever may be balanced by the mass of the magnet and the other side of the lever as described above. In addition, the face of the magnet may be subdivided into portions of opposite magnetic polarity, or may be two or more separate magnets arranged in a suitable configuration. In the illustrated embodiment, the face of the magnet 430 is magnetically polarized oppositely by halves 710, 720 as shown. It is appreciated that the magnetic polarizations may be achieved using a variety of techniques including fabricating one or more separate permanent magnets into an assembly of different polarizations. Each magnet assembly may have a face with different polarizations wherein each polarization is provided by a separate magnet or a portion of a magnet. Also, the relative proportions of the different polarizations may vary, depending upon the particular application.

The process illustrated with reference to FIG. 9 may be tangibly embodied in a computer-readable medium or carrier, e.g. one or more of the fixed and/or removable data storage devices 388 illustrated in FIG. 3, or other data storage devices. The computer program 390 may be loaded into the memory 317 or the position controller 316 of FIG. 1, for execution. The computer program 390 comprise instructions which, when read and executed by the position controller 316 of FIG. 1, causes the tape system 300 to perform operations in accordance with the present description.

Thus, the described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic implemented in a hardware device (e.g., an integrated circuit chip, Programmable Gate Array (PGA), Application Specific Integrated Circuit (ASIC), etc.). Still further, the article of manufacture implementing the code may comprise a receiver or transmitter device or other physical carrier capable of processing or implementing the code as "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. Of course, those skilled in the art will recognize that many modifications may be made to this configuration without departing from the scope of the present invention, and that the article of manufacture may comprise suitable information bearing medium known in the art.

The foregoing description of exemplary embodiments has been presented for the purposes of illustration and explanation. It is not intended to be exhaustive or to limit the description to the precise form disclosed. Many modifications and variations are possible in light of the above teaching.

What is claimed is:

1. A tape read/write head actuator for a tape drive system for a tape, comprising:
   a coil adapted to conduct an electric current to generate a magnetic field;
   a return path structure formed of a magnetically permeable material, and positioned adjacent said coil to conduct said magnetic field generated by said coil;
   a base having a first support frame;
   a lever pivotally coupled to said first support frame at a pivot point;
   a tape read/write head supported by said lever on a first side of said pivot point;
   a first permanent magnet supported by said lever on a second side of said pivot point opposite said first side wherein said magnet is positioned facing said return path structure so that magnetic attraction between said magnet and said return path structure biases said magnet and said tape read/write head in a first position relative to said first support frame, and so that current conducted through said coil generates a magnetic field which is conducted by said return path structure to interact with the magnetic field of said magnet which causes said lever and said tape read/write head to pivot relative to said first support frame as a function of the magnitude and direction of said current through said coil.

2. The actuator of claim 1 wherein said magnetic return path structure defines a gap and said magnet is positioned in said gap so that said magnet, in the absence of a coil generated magnetic field, centers itself in the middle of said gap of said magnetic return path structure.

3. The actuator of claim 1 wherein the mass of said read/write head and the first side of said lever is balanced by the mass of said magnet and the second side of said lever.

4. The actuator of claim 1 wherein said tape drive system is adapted to move said tape along said tape path in a longitudinal direction across said tape head, said tape having tracks extending in said longitudinal direction, said tape being subject to transient movement in a lateral direction with respect to said longitudinal direction, said actuator further comprising:
   a tape track sensor positioned to detect tracks of the tape; and
   a controller responsive to the tape track sensor and adapted to control the current through said coil to pivot said lever and said tape read/write head relative to said first support frame to control the position of the tape head relative to the tape tracks as a function of the magnitude and direction of said current through said coil.

5. The actuator of claim 1 wherein said magnet has a face facing said magnetic return structure, said face being subdivided into portions of opposite magnetic polarity.

6. The actuator of claim 1 further comprising a magnet assembly having a plurality of magnets and a face facing said magnetic return structure, each face being divided into portions of opposite magnetic polarity wherein said magnet assembly includes said first permanent magnet.

7. The actuator of claim 1 wherein said lever includes a magnet holder adapted to hold said magnet.

8. The actuator of claim 7 wherein said return path structure formed of a magnetically permeable material includes a core around which said coil is wound, and first and second parallel members, each member being disposed at an end of said core, said permanent magnet and said magnet holder extending between said members of said return path structure.

9. The actuator of claim 1 wherein said permanent magnet supported by said lever, and said return path structure of magnetically permeable material are configured to provide a magnetic path which dampens the dynamic response of said lever to pivoting.

10. A method, comprising:
    biasing a tape read/write head supported by a lever in a first position relative to a first support frame, using magnetic attraction between a permanent magnet supported by said lever, and a return path structure of magnetically permeable material;

sensing the lateral position of tracks on a moving tape; and
pivoting said lever and said tape read/write head relative to said first support frame, said pivoting including conducting current through a coil to generate a magnetic field which is conducted by said return path structure to interact with the magnetic field of said magnet which causes said lever to pivot on said pivot axis as a function of the magnitude and direction of said current through said coil.

11. The method of claim 10 wherein said biasing includes said magnet centering itself, in the absence of a coil generated magnetic field, in the middle of a gap of said magnetic return path structure.

12. The method of claim 10 wherein the mass of said read/write head and a first side of said lever is balanced by the mass of said magnet and a second side of said lever.

13. The method of claim 10 wherein said magnet has a face facing said magnetic return structure, said face being divided into portions of opposite magnetic polarity.

14. The method of claim 10 wherein said biasing and pivoting includes using a magnet assembly having a plurality of magnets and a face facing said magnetic return structure, each face being divided into portions of opposite magnetic polarity wherein said magnet assembly includes said first permanent magnet.

15. The method of claim 10 wherein said lever includes a magnet holder adapted to hold said magnet.

16. The method of claim 15 wherein said return path structure formed of a magnetically permeable material includes a core around which said coil is wound, and first and second parallel members, each member being disposed at an end of said core, said permanent magnet and said magnet holder extending between said members of said return path structure.

17. The method of claim 15 wherein said pivoting includes damping the dynamic response of said lever using a magnetic path which includes said permanent magnet supported by said lever, and said return path structure of magnetically permeable material.

18. A tape drive system for a tape, comprising:
a tape read/write head;
a drive mechanism adapted to longitudinally transport a tape past said tape read/write head;
a coil adapted to conduct an electric current to generate a magnetic field;
a return path structure formed of a magnetically permeable material, and positioned adjacent said coil to conduct said magnetic field generated by said coil;
a base having a first support frame;
a lever pivotally coupled to said first support frame at a pivot point and supporting said tape read/write head on a first side of said pivot point;
a first permanent magnet supported by said lever on a second side of said pivot point opposite said first side wherein said magnet is positioned facing said return path structure so that magnetic attraction between said magnet and said return path structure biases said magnet and said tape read/write head in a first position relative to said first support frame, and so that current conducted through said coil generates a magnetic field which is conducted by said return path structure to interact with the magnetic field of said magnet which causes said lever and said tape read/write head to pivot relative to said first support frame as a function of the magnitude and direction of said current through said coil.

19. The system of claim 18 wherein said magnetic return path structure defines a gap and said magnet is positioned in said gap so that said magnet, in the absence of a coil generated magnetic field, centers itself in the middle of said gap of said magnetic return path structure.

20. The system of claim 18 wherein the mass of said read/write head and the first side of said lever is balanced by the mass of said magnet and the second side of said lever.

21. The system of claim 18 wherein said tape drive system is adapted to move said tape along said tape path in a longitudinal direction across said tape head, said tape having tracks extending in said longitudinal direction, said tape being subject to transient movement in a lateral direction with respect to said longitudinal direction, said system further comprising:
a tape track sensor positioned to detect tracks of the tape; and
a controller responsive to the tape track sensor and adapted to control the current through said coil to pivot said lever and said tape read/write head relative to said first support frame to control the position of the tape head relative to the tape tracks as a function of the magnitude and direction of said current through said coil.

22. The system of claim 18 wherein said magnet has a face facing said magnetic return structure, said face being subdivided into portions of opposite magnetic polarity.

23. The system of claim 18 further comprising a magnet assembly having a plurality of magnets and a face facing said magnetic return structure, each face being divided into portions of opposite magnetic polarity wherein said magnet assembly includes said first permanent magnet.

24. The system of claim 18 wherein said lever includes a magnet holder adapted to hold said magnet, and wherein said return path structure formed of a magnetically permeable material includes a core around which said coil is wound, and first and second parallel members, each member being disposed at an end of said core, said permanent magnet and said magnet holder extending between said members of said return path structure.

25. The system of claim 18 wherein said permanent magnet supported by said lever, and said return path structure of magnetically permeable material are configured to provide a magnetic path which dampens the dynamic response of said lever to pivoting.

* * * * *